US012755698B2

(12) United States Patent
Lee

(10) Patent No.: US 12,755,698 B2
(45) Date of Patent: Oct. 6, 2026

(54) PIXEL AND DISPLAY DEVICE INCLUDING THE SAME, AND ELECTRONIC DEVICE

(71) Applicant: Samsung Display Co., Ltd., Yongin-si (KR)

(72) Inventor: Kyung Hun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/098,829

(22) Filed: Apr. 2, 2025

(65) Prior Publication Data

US 2025/0349252 A1 Nov. 13, 2025

(30) Foreign Application Priority Data

May 13, 2024 (KR) ........................ 10-2024-0062716

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/0233* (2013.01); *G09G 2330/028* (2013.01)

(58) Field of Classification Search
CPC ......... G09G 3/3233; G09G 2300/0819; G09G 2300/0842; G09G 2310/08; G09G 2320/0233; G09G 2330/028; G09G 3/3275
See application file for complete search history.

(56) References Cited

U.S. PATENT DOCUMENTS

| | | | |
|---|---|---|---|
| 11,783,779 B2 | 10/2023 | Lee et al. | |
| 11,809,652 B2 | 11/2023 | Hwang | |
| 12,008,959 B2 | 6/2024 | Lee et al. | |
| 2024/0071305 A1* | 2/2024 | Kim | G09G 3/3275 |

FOREIGN PATENT DOCUMENTS

| | | |
|---|---|---|
| EP | 4 012 697 A1 | 6/2022 |
| KR | 10-2023-0009257 A | 1/2023 |
| KR | 10-2023-0044909 A | 4/2023 |
| KR | 10-2023-0103149 A | 7/2023 |

* cited by examiner

*Primary Examiner* — Abdul-Samad A Adediran
(74) *Attorney, Agent, or Firm* — Womble Bond Dickinson (US) LLP

(57) ABSTRACT

A pixel includes a first transistor having a first electrode connected to a first power line, a gate electrode connected to a first node, and a second electrode connected to a second node; a light emitting element connected between the second node and a second power line; a second transistor connected between a data line and the first node and having a gate electrode connected to a first scan line; a third transistor connected between the second node and a lead-out line and having a gate electrode connected to a second scan line; and a fourth transistor having a first electrode connected to the first node or the second node, a second electrode connected to the lead-out line or a third power line, and a gate electrode connected to a third scan line.

19 Claims, 10 Drawing Sheets

PIXEL AND DISPLAY DEVICE INCLUDING THE SAME, AND ELECTRONIC DEVICE

CROSS-REFERENCE TO RELATED APPLICATION

The present application claims priority to and the benefit of Korean Patent Application No. 10-2024-0062716 filed in the Korean Intellectual Property Office on May 13, 2024, the entire disclosure of which is incorporated herein by reference.

BACKGROUND

1. Field

Aspects of the present disclosure relates to a pixel and a display device including the same, and an electronic device.

2. Description of the Related Art

As information technology develops, the importance of display devices, which are a connection medium between users and information, is emerging. Accordingly, the use of display devices such as liquid crystal display devices, organic light emitting display devices, and the like has been increasing.

The display device displays an image using pixels. The pixels receive a data signal in units of frames and emit light with a luminance corresponding to the data signal to the outside, thereby displaying an image on the display device.

The above information disclosed in this Background section is only for enhancement of understanding of the background of the invention and therefore it may contain information that does not form the prior art.

SUMMARY

Aspects of some of embodiments of the present disclosure are directed to a pixel that may display an image with uniform luminance regardless of a data signal of a previous frame, a display device including the same, and an electronic device.

According to some embodiments of the present disclosure, there is provided a pixel including: a first transistor having a first electrode connected to a first power line, a gate electrode connected to a first node, and a second electrode connected to a second node; a light emitting element connected between the second node and a second power line; a second transistor connected between a data line and the first node and having a gate electrode connected to a first scan line; a third transistor connected between the second node and a lead-out line and having a gate electrode connected to a second scan line; and a fourth transistor having a first electrode connected to the first node or the second node, a second electrode connected to the lead-out line or a third power line, and a gate electrode connected to a third scan line.

In some embodiments, a voltage of a first initialization power source is supplied to the lead-out line, and a second initialization power source having a voltage equal to or less than the first initialization power source is supplied to the third power line.

In some embodiments, the first electrode of the fourth transistor is connected to the first node, and the second electrode of the fourth transistor is connected to the lead-out line.

In some embodiments, the first electrode of the fourth transistor is connected to the first node, and the second electrode of the fourth transistor is connected to the third power line.

In some embodiments, the first electrode of the fourth transistor is connected to the second node, and the second electrode of the fourth transistor is connected to the lead-out line.

In some embodiments, the first electrode of the fourth transistor is connected to the second node, and the second electrode of the fourth transistor is connected to the third power line.

In some embodiments, each of the first initialization power source and the second initialization power source is set to a voltage that turns off the first transistor when supplied to the first node and turns off the light emitting element when supplied to the second node.

In some embodiments, the fourth transistor is turned on during a first period of a frame period, and the second transistor and the third transistor are turned on during a second section after the first period.

In some embodiments, the third scan line is one of a plurality of second scan lines on a previous horizontal line.

In some embodiments, the pixel further includes: a storage capacitor connected between the first node and the second node.

According to some embodiments of the present disclosure, there is provided a display device including: pixels connected to scan lines, data lines, and lead-out lines; a scan driver driving the scan lines; and a data driver driving the data lines, wherein at least one of the pixels includes: a first transistor having a first electrode connected to a first power line, a gate electrode connected to a first node, and a second electrode connected to a second node; a light emitting element connected between the second node and a second power line; a second transistor connected between one of the data lines and the first node and configured to turn on in response to a first scan signal being received from the scan driver; a third transistor connected between a lead-out line of the lead-out lines and the second node and configured to turn on in response to a second scan signal being received from the scan driver; a fourth transistor having a first electrode connected between the first node and the second node and a second electrode connected between the lead-out line and a third power line, and configured to turn on in response to a third scan signal being received from the scan driver; and a storage capacitor connected between the first node and the second node.

In some embodiments, a voltage of a first initialization power source is supplied to the lead-out line, and a second initialization power source having a voltage equal to or less than the first initialization power source is supplied to the third power line.

In some embodiments, the first electrode of the fourth transistor is connected to the first node, and the second electrode of the fourth transistor is connected to the lead-out line.

In some embodiments, the first electrode of the fourth transistor is connected to the first node, and the second electrode of the fourth transistor is connected to the third power line.

In some embodiments, the first electrode of the fourth transistor is connected to the second node, and the second electrode of the fourth transistor is connected to the lead-out line.

In some embodiments, the first electrode of the fourth transistor is connected to the second node, and the second electrode of the fourth transistor is connected to the third power line.

In some embodiments, the scan driver is configured to supply a third scan signal during a first period of a frame period, and to supply the first scan signal and the second scan signal during a second period after the first period.

In some embodiments, the third scan signal supplied to an i-th horizontal line (where i is a natural number) is the second scan signal supplied to an (i−1)-th horizontal line.

According to some embodiments of the present disclosure, there is provided an electronic device including: a display panel including pixels; a processor configured to drive the display panel; and a voltage generation circuit configured to supply a voltage of a driving power source to the display panel, wherein at least one of the pixels includes: a first transistor having a first electrode connected to a first power line, a gate electrode connected to a first node, and a second electrode connected to a second node; a light emitting element connected between the second node and a second power line; a second transistor connected between a data line and the first node and having a gate electrode connected to a first scan line; a third transistor connected between the second node and a lead-out line and having a gate electrode connected to a second scan line; a fourth transistor having a first electrode connected to the first node or the second node, a second electrode connected to the lead-out line or a third power line, and a gate electrode connected to a third scan line; and a storage capacitor connected between the first node and the second node.

In some embodiments, a voltage of a first initialization power source is supplied to the lead-out line, and a second initialization power source having a voltage equal to or less than the first initialization power source is supplied to the third power line.

However, aspects and effects of the present disclosure are not limited to the above, and may be variously extended without departing from the spirit and scope of the present disclosure.

BRIEF DESCRIPTION OF THE DRAWINGS

Non-limiting and non-exhaustive embodiments according to the present disclosure are described with reference to the following figures, wherein like reference numerals refer to like parts throughout the various views unless otherwise specified.

DETAILED DESCRIPTION

Figure 1:
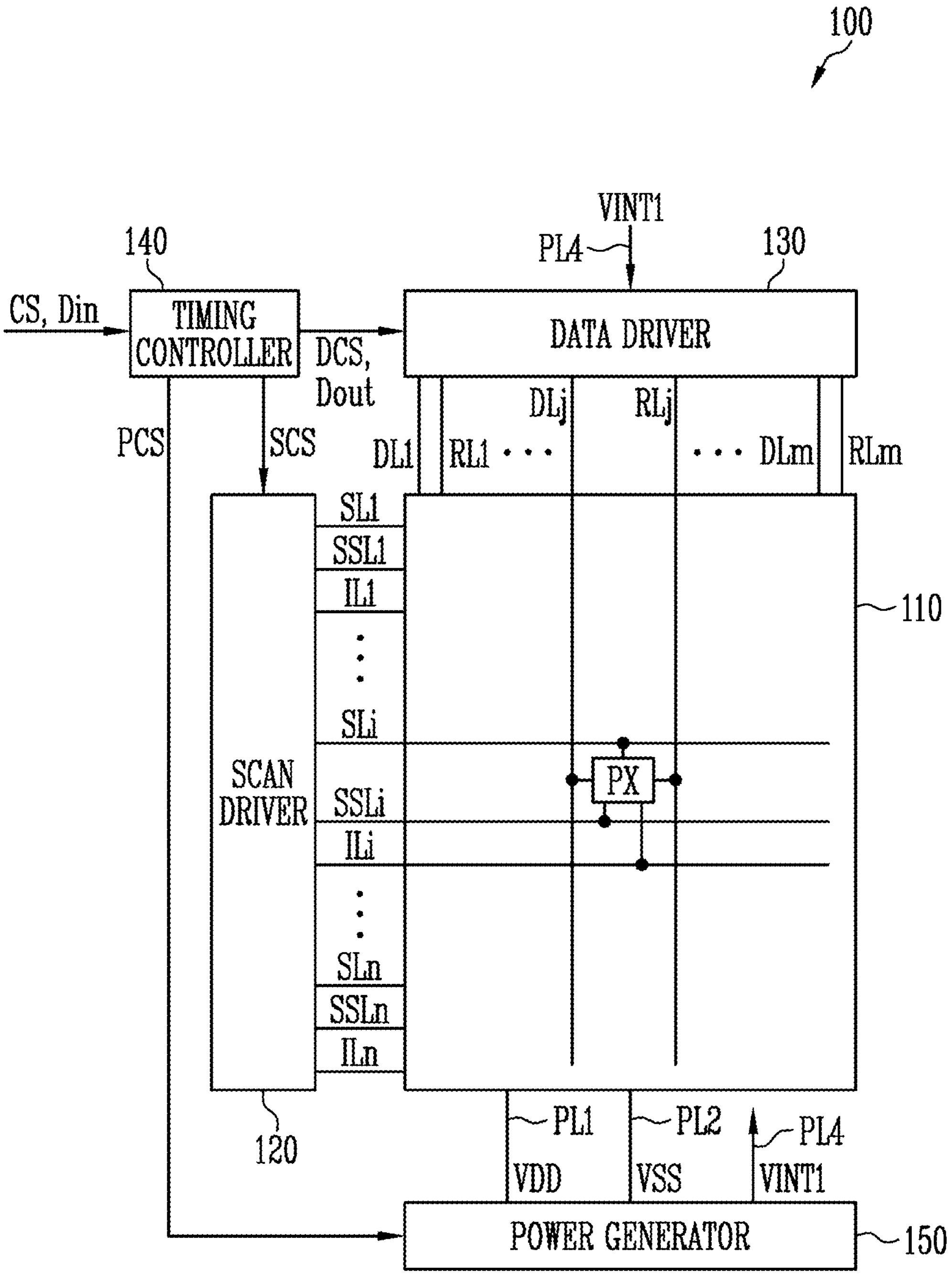
FIG. 1 illustrates a schematic diagram of a display device according to some embodiments of the present disclosure.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In order to clearly describe the present disclosure, parts or portions that are irrelevant to the description may be omitted, and identical or similar constituent elements throughout the specification are denoted by the same reference numerals. Therefore, the above-mentioned reference numerals may be used in other drawings.

In addition, the expression "same" in the description may mean "substantially the same."

That is, it may be the same enough to convince those skilled in the art to be the same. Even other expressions may be expressions from which "substantially" is omitted.

Some embodiments are described in the accompanying drawings in relation to functional blocks, units, and/or modules. Those skilled in the art will understand that these blocks, units, and/or modules are physically implemented by logic circuits, discrete components, microprocessors, hard-wired circuits, memory elements, wire connections, and other electronic circuits. These may be formed by using semiconductor-based manufacturing techniques or other manufacturing techniques. In the case of the blocks, units, and/or modules being implemented by microprocessors or other similar hardware, they may be programmed and controlled by using software to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. In addition, each block, unit, and/or module of some embodiments may be physically separated into two or more interacting and discrete blocks, units, and/or modules without departing from the inventive concepts. Further, the blocks, units, and/or modules of some embodiments may be physically combined into more complex blocks, units, and/or modules without departing from the inventive concepts.

"Connection" between two elements may comprehensively mean both electrical and physical connections, but is not necessarily limited thereto. For example, "connection" used based on a circuit diagram may mean an electrical connection, and "connection" used based on a cross-sectional view and a top plan view may mean a physical connection.

Although the terms "first", "second", and the like are used to describe various constituent elements, these constituent elements are not limited by these terms. These terms are merely used to distinguish one constituent element from another. Therefore, the first constituent elements described below may be the second constituent elements within the technical spirit of the present disclosure.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," "comprising," "has," "have," and "having," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For example, the expression "A and/or B" denotes A, B, or A and B. Expressions such as "one or more of" and "at least one of," when preceding a list of elements, modify the entire list of elements and do not modify the individual elements of the list. For example, the expression "one or more of A, B, and C," "at least one of A, B, or C," "at least one of A, B, and C," and "at least one selected from the group consisting of A, B, and C" indicates only A, only B, only C, both A and B, both A and C, both B and C, or all of A, B, and C.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", "in contact with", "in direct contact with", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art. Further, if the term "substantially" is used in combination with a feature that could be expressed using a numeric value, the term "substantially" denotes a range of +/−5% of the value centered on the value. Furthermore, a specific quantity or range recited in this written description or the claims may also encompass the inherent variations in measured or calculated values that would be recognized by those of ordinary skill in the art.

As used herein, the terms "use," "using," and "used" may be considered synonymous with the terms "utilize," "utilizing," and "utilized," respectively.

However, the present disclosure is not limited to the embodiments disclosed hereinafter and may be implemented in various forms. In addition, each embodiment disclosed below may be implemented alone, or may be implemented in combination with at least one another embodiment.

FIG. 1 illustrates a schematic diagram of a display device according to some embodiments of the present disclosure.

Referring to FIG. 1, a display device 100 according to some embodiments of the present disclosure may include a display portion 110 (e.g., a display panel), a scan driver 120, a data driver 130, a timing controller 140, and a power generator 150. The scan driver 120, the data driver 130, the timing controller 140, and the power generator 150 may configure a driving device for driving the display portion 110.

The display portion 110 may display an image. The display portion 110 may be provided with pixels PX connected to first scan lines (SL1, . . . , SLi, . . . , SLn), second scan lines (SSL1, . . . , SSLi, . . . , SSLn), third scan lines (IL1, . . . , ILi, . . . , ILn), data lines (DL1, . . . , DLj, . . . , DLm), lead-out lines (RL1, . . . , RLj, . . . , RLm) (where n and m are natural numbers of 3 or more, i is a natural number of n or less and 1 or more, and j is a natural number of m or less and 1 or more).

The pixel PX may be connected to one of the first scan lines SL1 to SLn and one of the data lines DL1 to DLm. In addition, the pixel PX may be connected to one of the second scan lines SSL1 to SSLn, one of the third scan lines IL1 to ILn, and one of the lead-out lines RL1 to RLm.

For example, the pixels PX disposed in an i-th row and a j-th column may be connected to an i-th first scan line SLi, an i-th second scan line SSLi, an i-th third scan line ILi, a j-th data line DLj, and a j-th lead-out line RLj. In addition, the pixel PX may be connected to a first power line PL1 to which a first driving power source VDD is applied and a second power line PL2 to which a second driving power source VSS is applied.

The i-th third scan line ILi may be set to one of the second scan lines (or first scan lines) disposed in a previous horizontal line (e.g., an (i−1)-th horizontal line, an (i−2)-th horizontal line, . . . ). For example, the i-th third scan line ILi may be set to the second scan line SSLi−1 (see, e.g., FIG. 3) disposed on the (i−1)-th horizontal line. To this end, at least one dummy second scan line, which is not shown, may be additionally formed at an upper side of the first second scan line SSL1. When each of the third scan lines IL1 to ILn is set to one of the second scan lines disposed in the previous horizontal line, the third scan lines IL1 to ILn may be replaced with the second scan lines SSL1 to SSLn.

In some embodiments, the pixel PX may supply a voltage of a first initialization power source VINT1 or second initialization power source VINT2 (see, e.g., FIG. 5) to a gate electrode of a driving transistor in response to the third scan signal provided through the third scan line ILi. Then, the voltage of the data signal corresponding to the previous frame may be initialized by the voltage of the first initialization power source VINT1 or the second initialization power source VINT2. This will be described in further detail later with reference to FIG. 3 and FIG. 5.

In some embodiments, the pixel PX may supply the voltage of the first initialization power source VINT1 or the second initialization power source VINT2 to a first electrode (e.g., an anode electrode) of a light emitting element LD (see, e.g., FIG. 6) in response to the third scan signal provided through the third scan line ILi. Then, the voltage of the first electrode of the light emitting element LD raised by the voltage of the data signal corresponding to the previous frame may be initialized by the voltage of the first initialization power source VINT1 or the second initialization power source VINT2. This will be described in further detail later with reference to FIG. 6 and FIG. 7.

After the third scan signal is supplied to the pixel PX, the pixel PX may be initialized by the first initialization power source VINT1 provided through the lead-out line RLj in response to the second scan signal provided through the second scan line SSLi, and may receive a data signal (e.g., a data voltage) through the data line DLj in response to the first scan signal provided through the first scan line SLi. In response to the data signal, the pixel PX may generate light with a luminance corresponding to the data signal while controlling the amount of current flowing from the first driving power source VDD to the second driving power source VSS via the light emitting element LD. The first initialization power source VINT1 may be set to a voltage lower than an operation point (e.g., threshold voltage) of the light emitting element LD.

The scan driver 120 may generate a first scan signal, a second scan signal, and a third scan signal based on the scan control signal SCS. The first scan signal may be sequentially supplied to the first scan lines SL1 to SLn, the second scan signal may be sequentially supplied to the second scan lines SSL1 to SSLn, and the third scan signal may be sequentially supplied to the third scan lines IL1 to ILn. The third scan signal may be replaced with the second scan signal.

Here, each of the first scan signal, the second scan signal, and the third scan signal may be referred to as an enable first scan signal, an enable second scan signal, and an enable third scan signal. Each of the enable first scan signal, the enable second scan signal, and the enable third scan signal may be set to a gate-on voltage so that the transistor included in the pixel PX may be turned on. For example, when an N-type transistor is included in the pixel PX, each of the enable first scan signal, the enable second scan signal, and the enable third scan signal may be set to a logic high voltage.

The scan control signal SCS may include a start signal, a clock signal, and the like, and may be provided from the timing controller 140 to the scan driver 120. The scan driver 120 may be implemented as a shift register that sequentially generates and outputs a pulse-type enable first scan signal by sequentially shifting a start signal in response to a clock signal. In addition, the scan driver 120 may generate and output an enable second scan signal similar to the method of generating the enable first scan signal. In addition, the scan driver 120 may generate and output an enable third scan signal similar to the method of generating the enable first scan signal.

The scan driver 120 may be formed together with the pixel PX on the display portion 110. However, the present disclosure is not limited thereto, and for example, the scan driver 120 may be mounted on a circuit film and connected to the timing controller 140 via at least one circuit film and a printed circuit board.

The data driver 130 may generate a data signal (e.g., data voltage) based on the output data Dout and the data control signal DCS provided from the timing controller 140, and may transmit the data signal to the display portion 110 (e.g., the pixel PX) through the data lines DL1 to DLm. Here, the data control signal DCS may include a data enable signal, a data clock signal, and the like. The data driver 130 may provide the first initialization power source VINT1 to the display portion 110 (e.g., the pixel PX) through the lead-out lines RL1 to RLm.

In some embodiments, the data driver 130 may receive a sensing signal through at least one lead-out line (at least one of RL1 to RLm) in a separate sensing period (e.g., in a sensing period allocated to sense characteristic information of the pixel PX, such as a threshold voltage and/or mobility of the driving transistor included in the pixel PX). The sensing signal may be used in the data driver 130 and/or the timing controller 140 to compensate for the characteristic (or characteristic deviation) of the pixel PX.

The power generator 150 may generate the first driving power source VDD, the second driving power source VSS, and the first initialization power source VINT1 based on the power control signal PCS provided from the timing controller 140. The first driving power source VDD may be supplied to the pixels PX of the display portion 110 via the first power line PL1. The second driving power source VSS may be supplied to the pixels PX of the display portion 110 via the second power line PL2. The first initialization power source VINT1 may be supplied to the data driver 130 via fourth power line PL4.

The first driving power source VDD may be a power source for supplying a driving current to the pixel PX, and the second driving power source VSS may be a power source for receiving a driving current from the pixel PX. During the light emitting period of the pixel PX, the first driving power source VDD may be set to a voltage higher than the second driving power source VSS. The first initialization power source VINT1 is a voltage that initializes the first electrode of the light emitting element LD, and may be set to a voltage at which the light emitting element LD is turned off.

The power generator 150 may provide a driving voltage utilized for driving to at least one of the scan driver 120, the data driver 130, and the timing controller 140. The power generator 150 may be implemented as a power management IC (PMIC).

The timing controller 140 may receive input data Din and a control signal CS from the outside (e.g., a graphics processor, an application processor, and the like), and generate a scan control signal SCS, a data control signal DCS, and a power control signal PCS based on the control signal CS.

In some embodiments, the timing controller 140 may correct the input data Din to generate output data Dout. For example, the timing controller 140 may generate the output data Dout by correcting the input data Din so that the characteristics of the driving transistor included in the pixel PX are compensated in response to the sensing signal (e.g., sensing data) supplied from the data driver 130 during the sensing period.

Figure 2:
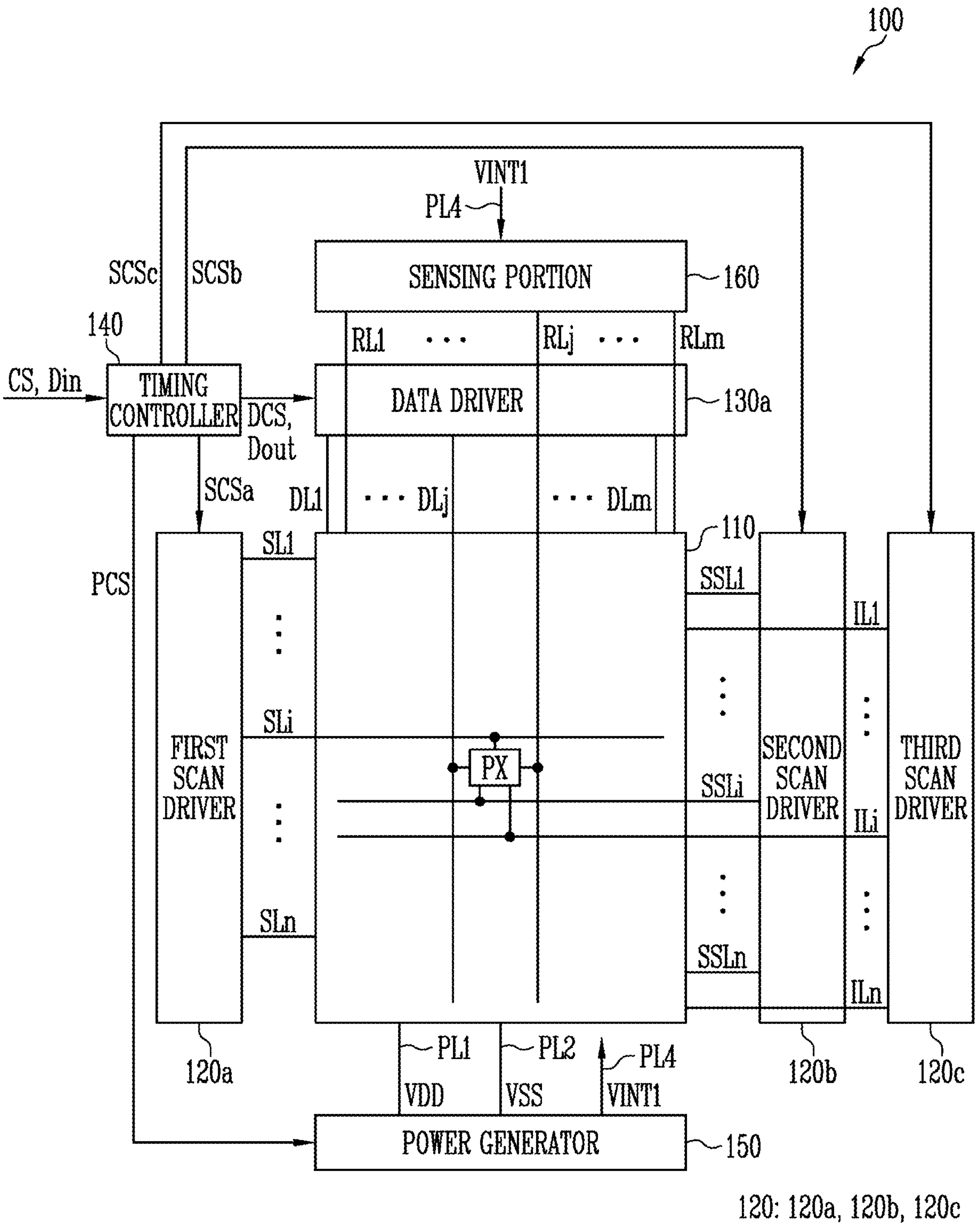
FIG. 2 illustrates a schematic diagram of a display device according to some embodiments of the present disclosure.

FIG. 2 illustrates a schematic diagram of a display device according to some embodiments of the present disclosure. When describing FIG. 2, a redundant description of the same configuration as that of FIG. 1 may not be repeated.

Referring to FIG. 2, the display device 100 according to some embodiments of the present disclosure may include a display portion 110, a scan driver 120, a data driver 130*a*, a timing controller 140, a power generator 150, and a sensing portion 160.

The scan driver 120 may include a first scan driver 120*a*, a second scan driver 120*b*, and a third scan driver 120*c*.

The first scan driver 120*a* may supply an enable first scan signal to the first scan lines SL1 to SLn based on the scan control signal SCSa from the timing controller 140. For example, the first scan driver 120*a* may sequentially supply the enable first scan signal to the first scan lines SL1 to SLn.

The second scan driver 120*b* may supply an enable second scan signal to the second scan lines SSL1 to SSLn based on the scan control signal SCSb from the timing controller 140. For example, the second scan driver 120*b* may sequentially supply the enable second scan signal to the second scan lines SSL1 to SSLn.

The third scan driver 120*c* may supply an enable third scan signal to the third scan lines IL1 to ILn based on the scan control signal SCSc from the timing controller 140. For example, the third scan driver 120*c* may sequentially supply the enabled third scan signal to the third scan lines IL1 to ILn.

In some embodiments, at least two of the first scan driver 120*a*, the second scan driver 120*b*, and the third scan driver 120*c* may be configured as one driver. In some embodiments, when the initialization lines IL1 to ILn are replaced with the second scan lines SSL1 to SSLn, the third scan driver 120*c* may be omitted.

The data driver 130 shown in FIG. 1 may be functionally divided into a data driver 130*a* and a sensing portion 160.

The data driver 130*a* may generate a data signal based on the output data Dout and the data control signal DCS provided from the timing controller 140, and may transmit the data signal to the display portion 110 (e.g., the pixel PX) through the data lines DL1 to DLm.

The sensing portion 160 may provide the first initialization power source VINT1 to the display portion 110 (e.g., the pixel PX) through the lead-out lines RL1 to RLm. In some embodiments, the sensing portion 160 may receive a sensing signal through at least one lead-out line (at least one of RL1 to RLm) in a separate sensing period. The sensing signal may include characteristic information of the driving transistor such as a threshold voltage and/or mobility of the driving transistor included in the pixel PX. The sensing signal may be used in the data driver 130*a* and/or the timing controller 140 to compensate for the characteristic (or characteristic deviation) of the pixel PX.

Figure 3:
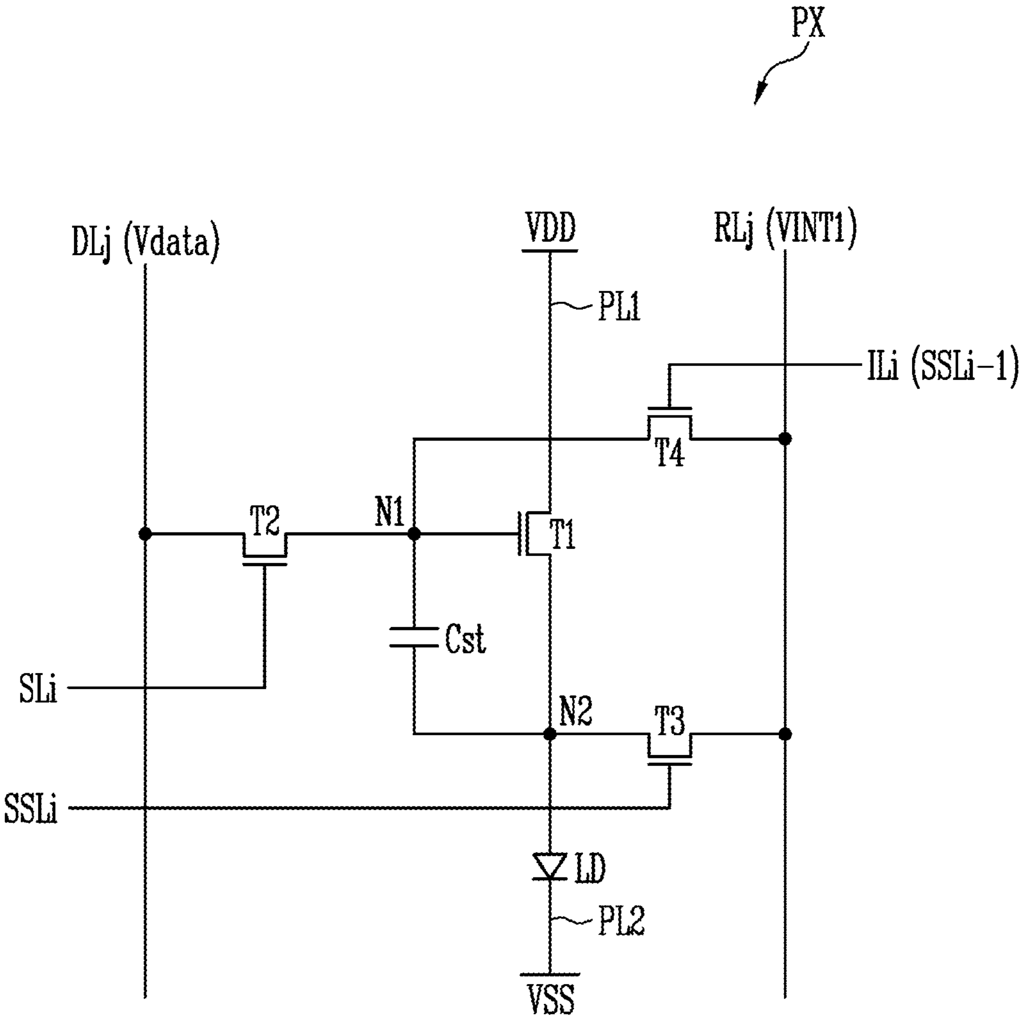
FIG. 3 illustrates a circuit diagram of a pixel shown in FIG. 1 and FIG. 2, according to some embodiments of the present disclosure.

FIG. 3 illustrates a circuit diagram of a pixel shown in FIG. 1 and FIG. 2, according to some embodiments of the present disclosure. In FIG. 3, a pixel PX disposed in an i-th row and a j-th column is illustrated as an example.

Referring to FIG. 3, the pixel PX may be connected to a first scan line SLi, a second scan line SSLi, a third scan line ILi, a data line DLj, and a lead-out line RLj. In some embodiments, the third scan line ILi may be a second scan line SSLi−1 disposed in a previous horizontal line (i.e. is, an (i−1)-th horizontal line). The pixel PX may be connected to a first power line PL1 and a second power line PL2.

The pixel PX may include a light emitting element LD, a first transistor T1 (e.g., a driving transistor), a second transistor T2, a third transistor T3, a fourth transistor T4, and a storage capacitor Cst.

A first electrode (e.g., an anode electrode) of the light emitting element LD may be connected to the first power line PL1 via a second node N2 and the first transistor T1, and a second electrode (e.g., a cathode electrode) thereof may be connected to the second power line PL2. The light emitting element LD may emit light with a luminance corresponding to a driving current supplied from the first transistor T1.

The light emitting element LD may be selected as an organic light emitting diode. In addition, the light emitting element LD may be selected as an inorganic light emitting diode such as a micro light emitting diode (LED), a quantum dot light emitting diode, or the like. In addition, the light emitting element LD may be an element made of (e.g., complexly made of) organic and inorganic materials. In FIG. 3, it is illustrated that the pixel PX includes a single light emitting element LD, but in another embodiment, the pixel PX may include a plurality of light emitting elements, and the plurality of light emitting elements may be connected in series, in parallel, or in series and parallel to each other.

Each of the first transistor T1, the second transistor T2, the third transistor T3, and the fourth transistor T4 may be a thin film transistor including an oxide semiconductor. Each of the first transistor T1, the second transistor T2, the third transistor T3, and the fourth transistor T4 may be an N-type transistor. However, the present disclosure is not limited thereto, and for example, at least some of the first transistor T1, the second transistor T2, the third transistor T3, and the fourth transistor T4 may be a P-type transistor including a polysilicon semiconductor.

A first electrode (e.g., a drain electrode) of the first transistor T1 may be connected to the first power line PL1 to which the first driving power source VDD is applied, and a second electrode thereof (e.g., a source electrode) may be connected to the second node N2. A gate electrode of the first transistor T1 may be connected to a first node N1. The first transistor T1 may control an amount of current flowing to the light emitting element LD in response to a voltage of the first node N1 (e.g., a gate-source voltage applied between the gate electrode and the second electrode of the first transistor T1).

A first electrode of the second transistor T2 may be connected to the data line DLj, and a second electrode thereof may be connected to the first node N1. A gate electrode of the second transistor T2 may be connected to the first scan line SLi. The second transistor T2 may be turned on when the enable first scan signal is supplied to the first scan line SLi to transmit the data signal Vdata from the data line DLj to the first node N1.

The storage capacitor Cst may be formed or connected between the first node N1 and the second node N2. The storage capacitor Cst may store a voltage of the first node N1.

The third transistor T3 may be connected between the lead-out line RLj and the second node N2. A gate electrode of the third transistor T3 may be connected to the second scan line SSLi. When the enable second scan signal is supplied to the second scan line SSLi, the third transistor T3 may be turned on to transmit the voltage of the first initialization power source VINT1 from the lead-out line RLj to the second node N2.

A first electrode of the fourth transistor T4 may be connected to the first node N1, and a second electrode thereof may be connected to the lead-out line RLj. A gate electrode of the fourth transistor T4 may be connected to the third scan line ILi. When the enable third scan signal is supplied to the third scan line ILi, the fourth transistor T4 may be turned on to transmit the voltage of the first initialization power source VINT1 from the lead-out line RLj to the first node N1. When the voltage of the first initialization power source VINT1 is supplied to the first node N1, the first transistor T1 may be turned off.

Figure 4:
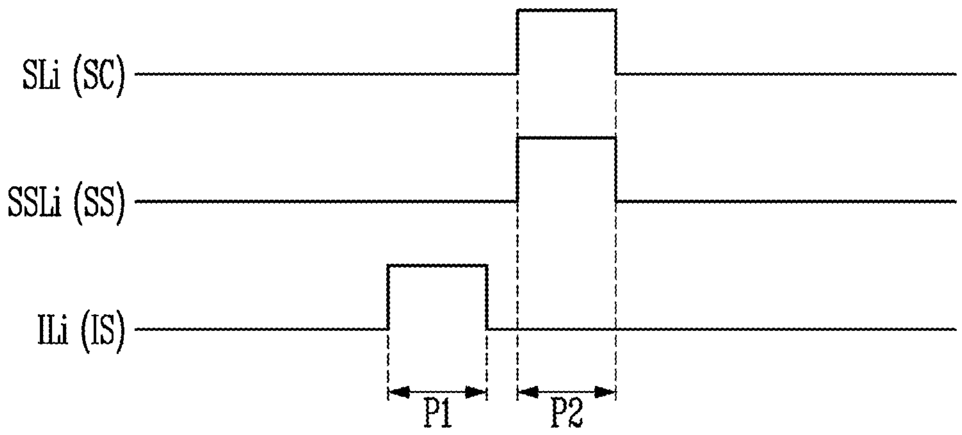
FIG. 4 illustrates a waveform diagram of a driving method of a pixel shown in FIG. 3, according to some embodiments of the present disclosure.

FIG. 4 illustrates a waveform diagram of a driving method of a pixel shown in FIG. 3, according to some embodiments of the present disclosure.

Referring to FIG. 4, the pixel PX may be driven in a first period P1 and a second period P2 in which one frame period is divided.

During the first period P1, the enable third scan signal IS is supplied to the third scan line ILi, and accordingly, the fourth transistor T4 may be turned on. When the fourth transistor T4 is turned on, a voltage of the first initialization power source VINT1 may be supplied from the lead-out line RLj to the first node N1. When the voltage of the first initialization power source VINT1 is supplied to the first node N1, the first node N1 may be initialized with the voltage of the first initialization power source VINT1 regardless of the previous data signal. The first initialization power source VINT1 is set to a voltage at which the first transistor T1 may be turned off, and accordingly, the light emitting element LD may be set to a non-light emitting state during the first period P1.

During the second period P2, the enable first scan signal SC may be supplied to the first scan line SLi, and the enable second scan signal SS may be supplied to the second scan line SSLi.

When the enable first scan signal SC is supplied to the first scan line SLi, the second transistor T2 is turned on. When the second transistor T2 is turned on, the data signal Vdata from the data line DLj is supplied to the first node N1. When the enable second scan signal SS is supplied to the second scan line SSLi, the third transistor T3 is turned on. When the third transistor T3 is turned on, the voltage of the first initialization power source VINT1 from the lead-out line RLj is supplied to the second node N2.

Accordingly, a voltage difference between the data signal Vdata and the first initialization power source VINT1 is stored in the storage capacitor Cst during the second period P2. During a period after the second period P2, the first transistor T1 may control the amount of driving current flowing through the light emitting element LD in response to the voltage difference stored in the storage capacitor Cst. Then, the light emitting element LD may generate light having a set or predetermined luminance in response to the driving current supplied from the first transistor T1.

In some embodiments of the present disclosure, because the first node N1 is initialized with the voltage of the first initialization power source VINT1 during the first period T1, light having a desired luminance may be generated in the pixel PX based on a grayscale value/level.

For example, the voltage of the second node N2 may increase to a voltage higher than the voltage of the first initialization power source VINT1 in response to the previous frame data signal. In addition, the voltage of the second node N2 may be set differently for each pixel PX in response to the previous frame data signal.

When the first period P1 is omitted, the voltage of the second node N2 should be initialized to the voltage of the first initialization power source VINT1 during the second period P2. However, when the second period P2 (e.g., horizontal period) is set to be substantially short, the voltage of the second node N2 may not be initialized to the voltage of the first initialization power source VINT1 during the second period P2. In this case, the voltages of respective pixels PX at the second node N2 may be differently set, and accordingly, light having a luminance corresponding to a grayscale value/level may not be generated in the pixel PX. For example, when the pixel PX is applied to a large panel (e.g., as the horizontal period (e.g., the second period P2) becomes shorter), light with a non-uniform luminance may be generated in each of the pixels PX in response to the same grayscale value/level.

On the other hand, when the voltage of the first initialization power source VINT1 is supplied to the first node N1 during the first period P1 as in some embodiments of the present disclosure, the voltage of the first node N1 may decrease to the voltage of the first initialization power source VINT1. In addition, the voltage of the second node N2 may decrease in response to the voltage decrease of the first node N1 by the coupling of the storage capacitor Cst. That is, during the first period P1, the first node N1 and the second node N2 may be initialized by the voltage of the first initialization power source VINT1.

When the voltage of the second node N2 decreases, the voltage of the second node N2 may be stably set to the voltage of the first initialization power source VINT1 during the second period P2. For example, because the voltage of the second node N2 primarily decreases during the first period P1, the voltage of the second node N2 during the second period P2 may be set to the voltage of the first initialization power source VINT1. In this case, light having the same luminance may be generated corresponding to the same gray scale value/level in respective pixels PX.

Figure 5:
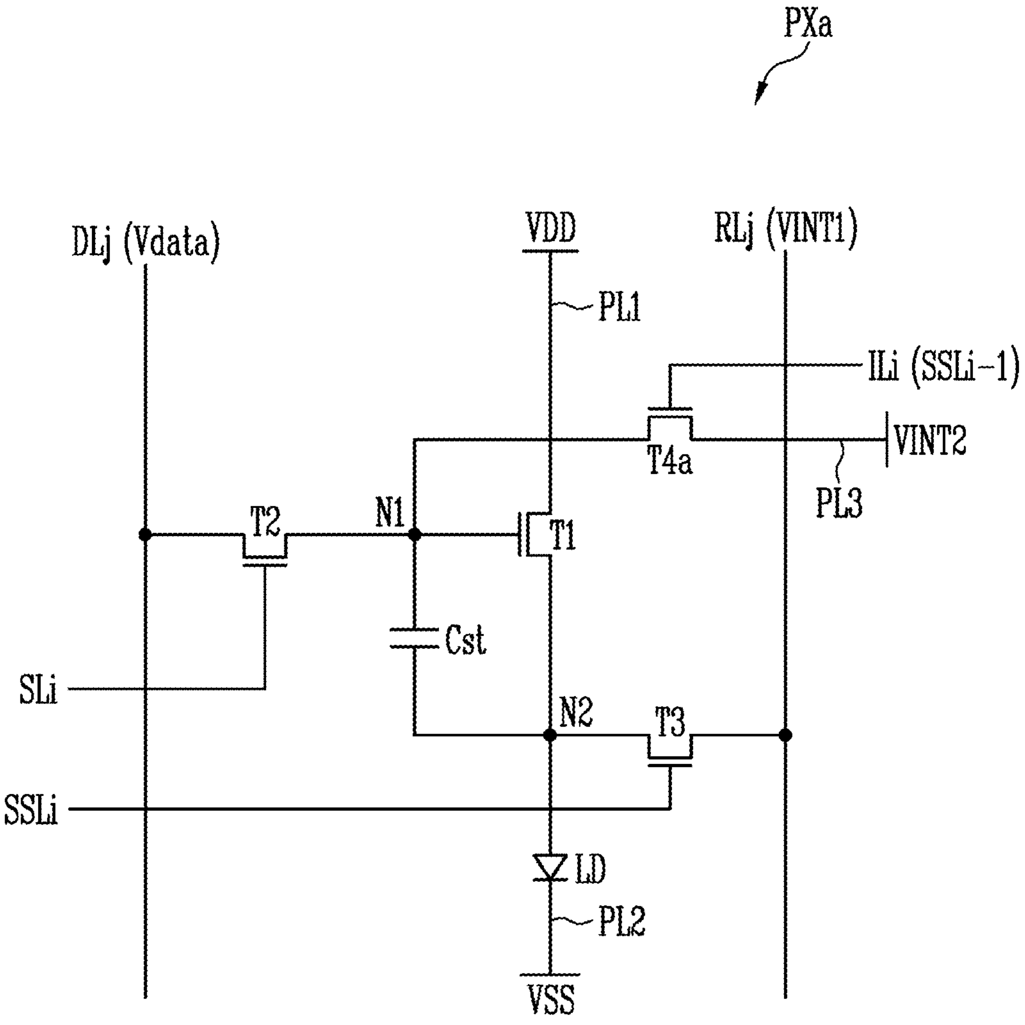
FIG. 5 illustrates a circuit diagram of a pixel shown in FIG. 1 and FIG. 2, according to some embodiments of the present disclosure.

FIG. 5 illustrates a circuit diagram of a pixel shown in FIG. 1 and FIG. 2, according to some embodiments of the present disclosure. In FIG. 5, a pixel PXa disposed in an i-th row and a j-th column is illustrated as an example. When describing FIG. 5, the same reference numerals are assigned to the same elements as those of FIG. 3, and redundant descriptions may not be repeated.

Referring to FIG. 5, the pixel PXa may be connected to a first scan line SLi, a second scan line SSLi, a third scan line ILi, a data line DLj, and a lead-out line RLj. In some embodiments, the third scan line ILi may be a second scan line SSLi−1 disposed in a previous horizontal line (i.e., an (i−1)-th row). The pixel PXa may be connected to the first power line PL1 and the second power line PL2.

The pixel PXa may include a light emitting element LD, a first transistor T1 (e.g., a driving transistor), a second transistor T2, a third transistor T3, a fourth transistor T4*a*, and a storage capacitor Cst.

A first electrode of the fourth transistor T4*a* may be connected to the first node N1, and a second electrode thereof may be connected to the third power line PL3. The second initialization power source VINT2 may be supplied to the third power line PL3. For example, the third power line PL3 may receive the second initialization power source VINT2 from the power generator 150. A gate electrode of the fourth transistor T4*a* may be connected to the third scan line ILi.

The second initialization power source VINT2 may be set to a voltage at which the first transistor T1 is turned off. A voltage of the second initialization power source VINT2 may be equal to or less than that of the first initialization power source VINT1. For example, the second initialization power source VINT2 may be set to a base potential GND.

In some embodiments, a voltage of the second initialization power source VINT2 may be experimentally determined so that the first node N1 (and the second node N2) may be stably initialized. Because the second initialization power source VINT2 is different from the first initialization power source VINT1, the voltage may be freely set in consideration of the panel size, resolution, and the like, and accordingly, operation stability may be secured.

When the enable third scan signal is supplied to the third scan line ILi, the fourth transistor T4*a* may be turned on to transmit the voltage of the second initialization power source VINT2 from the third power line PL3 to the first node N1. Other driving methods may be the same as the pixel PX of FIG. 3 described with reference to FIG. 4.

Figure 6:
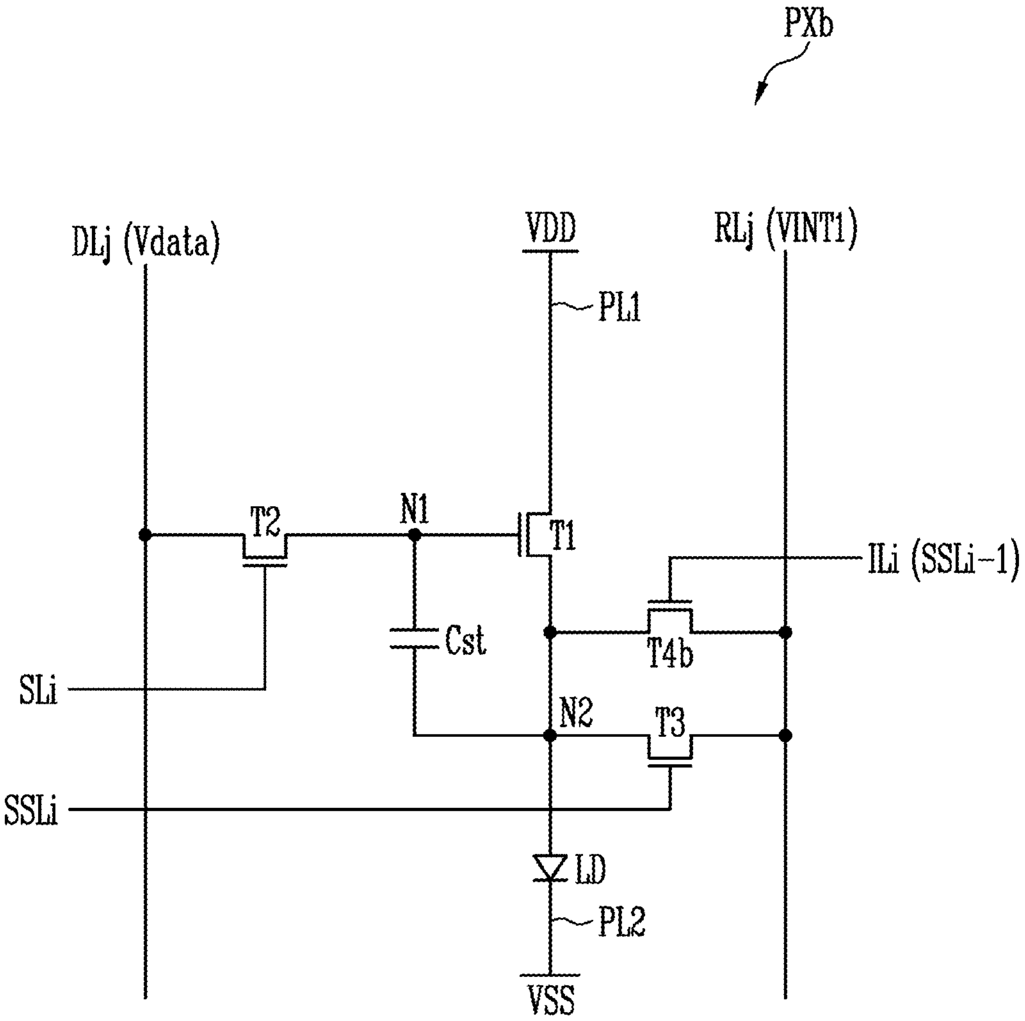
FIG. 6 illustrates a circuit diagram of a pixel shown in FIG. 1 and FIG. 2, according to some embodiments of the present disclosure.

FIG. 6 illustrates a circuit diagram of a pixel shown in FIG. 1 and FIG. 2, according to some embodiments of the present disclosure. In FIG. 6, a pixel PXb disposed in an i-th row and a j-th column is illustrated as an example. When describing FIG. 6, the same reference numerals are assigned to the same elements as those of FIG. 3, and redundant descriptions may not be repeated.

Referring to FIG. 6, the pixel PXb may be connected to a first scan line SLi, a second scan line SSLi, a third scan line ILi, a data line DLj, and a lead-out line RLj. In some embodiments, the third scan line ILi may be a second scan line SSLi−1 disposed in a previous horizontal line (i.e., an (i−1)-th row). The pixel PXb may be connected to the first power line PL1 and the second power line PL2.

The pixel PXb may include a light emitting element LD, a first transistor T1 (e.g., a driving transistor), a second transistor T2, a third transistor T3, a fourth transistor T4*b*, and a storage capacitor Cst.

A first electrode of the fourth transistor T4*b* may be connected to the second node N2, and a second electrode thereof may be connected to the lead-out line RLj. A gate electrode of the fourth transistor T4*b* may be connected to the third scan line ILi. When the enable third scan signal is supplied to the third scan line ILi, the fourth transistor T4*b* may be turned on to transmit the voltage of the first initialization power source VINT1 from the lead-out line RLj to the second node N2. When the voltage of the first initialization power source VINT1 is supplied to the first node N1, the light emitting element LD may be set to a non-light emitting state.

Referring to an operation process in connection with FIG. 4 and FIG. 6, the pixel PXb may be driven in the first period P1 and the second period P2 in which one frame period is divided.

During the first period P1, the enable third scan signal IS is supplied to the third scan line ILi, and accordingly, the fourth transistor T4*b* may be turned on. When the fourth transistor T4*b* is turned on, a voltage of the first initialization power source VINT1 may be supplied from the lead-out line RLj to the second node N2. When the voltage of the first initialization power source VINT1 is supplied to the second node N2, the second node N2 may be approximately initialized to the voltage of the first initialization power source VINT1.

During the second period P2, the enable first scan signal SC may be supplied to the first scan line SLi, and the enable second scan signal SS may be supplied to the second scan line SSLi.

When the enable first scan signal SC is supplied to the first scan line SLi, the second transistor T2 is turned on. When the second transistor T2 is turned on, the data signal Vdata from the data line DLj is supplied to the first node N1. When the enable second scan signal SS is supplied to the second scan line SSLi, the third transistor T3 is turned on. When the third transistor T3 is turned on, the voltage of the first initialization power source VINT1 from the lead-out line RLj is supplied to the second node N2.

That is, in some embodiments of the present disclosure, the voltage of the first initialization power source VINT1 may be primarily supplied to the second node N2 during the first period P1, and the voltage of the first initialization power source VINT1 may be secondarily supplied to the second node N2 during the second period P2. In this case, the second node N2 may be stably set to the voltage of the first initialization power source VINT1. When the second node N2 is stably set to the voltage of the first initialization power source VINT1, light having uniform luminance may be generated in each of the pixels PXb.

During the second period P2, a voltage difference between the data signal Vdata and the first initialization power source VINT1 is stored in the storage capacitor Cst. During a period after the second period P2, the first transistor T1 may control the amount of driving current flowing through the light emitting element LD in response to the voltage difference stored in the storage capacitor Cst. Then, the light emitting element LD may generate light having a set or predetermined luminance in response to the driving current supplied from the first transistor T1.

Figure 7:
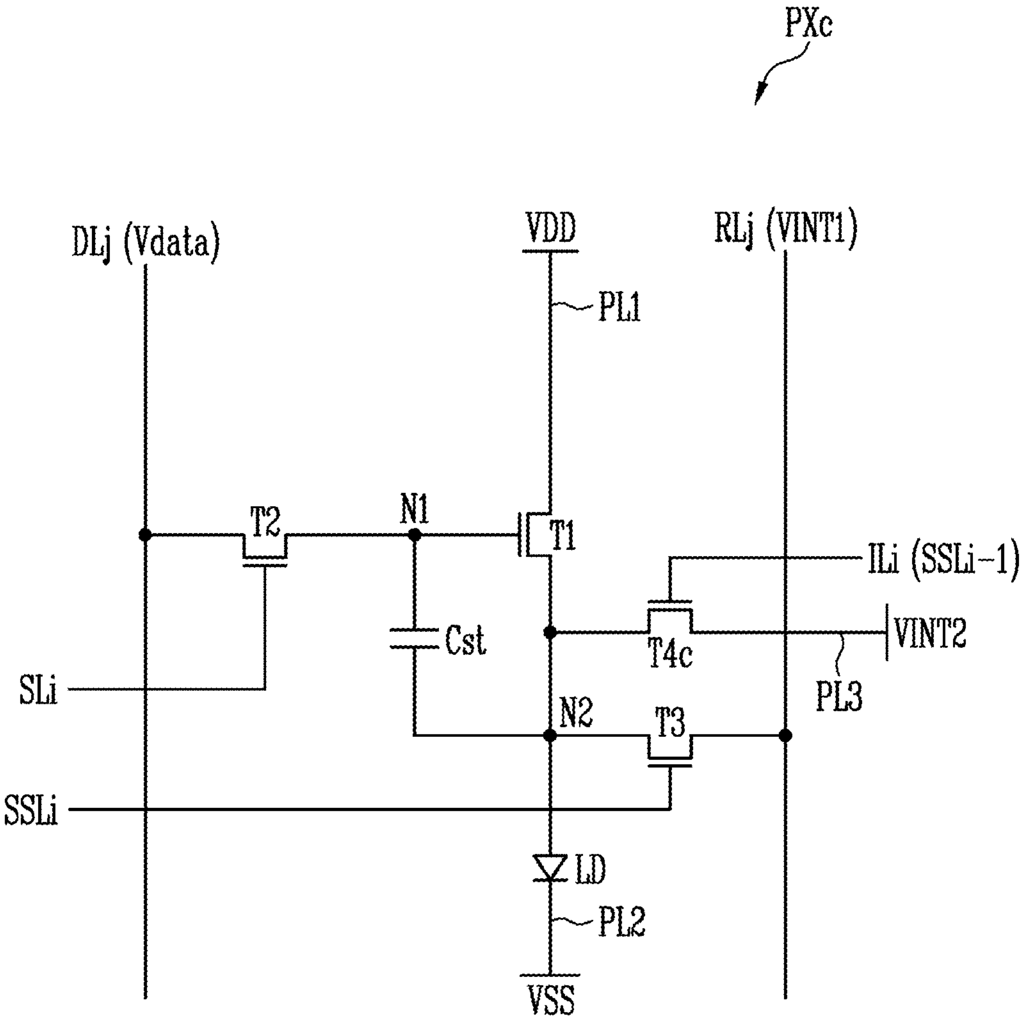
FIG. 7 illustrates a circuit diagram of a pixel shown in FIG. 1 and FIG. 2, according to some embodiments of the present disclosure.

FIG. 7 illustrates a circuit diagram of a pixel shown in FIG. 1 and FIG. 2, according to some embodiments of the present disclosure. In FIG. 7, a pixel PXc disposed in an i-th row and a j-th column is illustrated as an example. When describing FIG. 7, the same reference numerals are assigned to the same elements as those of FIG. 6, and redundant descriptions may not be repeated.

Referring to FIG. 7, the pixel PXc may be connected to a first scan line SLi, a second scan line SSLi, a third scan line ILi, a data line DLj, and a lead-out line RLj. In some embodiments, the third scan line ILi may be a second scan line SSLi−1 disposed in a previous horizontal line (i.e., an (i−1)-th row). The pixel PXc may be connected to the first power line PL1 and the second power line PL2.

The pixel PXc may include a light emitting element LD, a first transistor T1 (e.g., a driving transistor), a second transistor T2, a third transistor T3, a fourth transistor T4*c*, and a storage capacitor Cst.

A first electrode of the fourth transistor T4*c* may be connected to the second node N2, and a second electrode thereof may be connected to the third power line PL3. The second initialization power source VINT2 may be supplied to the third power line PL3. For example, the third power line PL3 may receive the second initialization power source VINT2 from the power generator 150. A gate electrode of the fourth transistor T4*c* may be connected to the third scan line ILi.

The second initialization power source VINT2 may be set to a voltage at which the light emitting element LD is turned off. A voltage of the second initialization power source VINT2 may be equal to or less than that of the first initialization power source VINT1. For example, the second initialization power source VINT2 may be set to a base potential GND.

In some embodiments, a voltage of the second initialization power source VINT2 may be experimentally determined so that the second node N2 may be stably initialized. Because the second initialization power source VINT2 is different from the first initialization power source VINT1, the voltage may be freely set in consideration of the panel size, resolution, and the like, and accordingly, operation stability may be secured.

When the enable third scan signal is supplied to the third scan line ILi, the fourth transistor T4*c* may be turned on to transmit the voltage of the second initialization power source VINT2 from the third power line PL3 to the second node N2. Other driving methods may be the same as that of the pixel PXb in FIG. 6.

Figure 8:
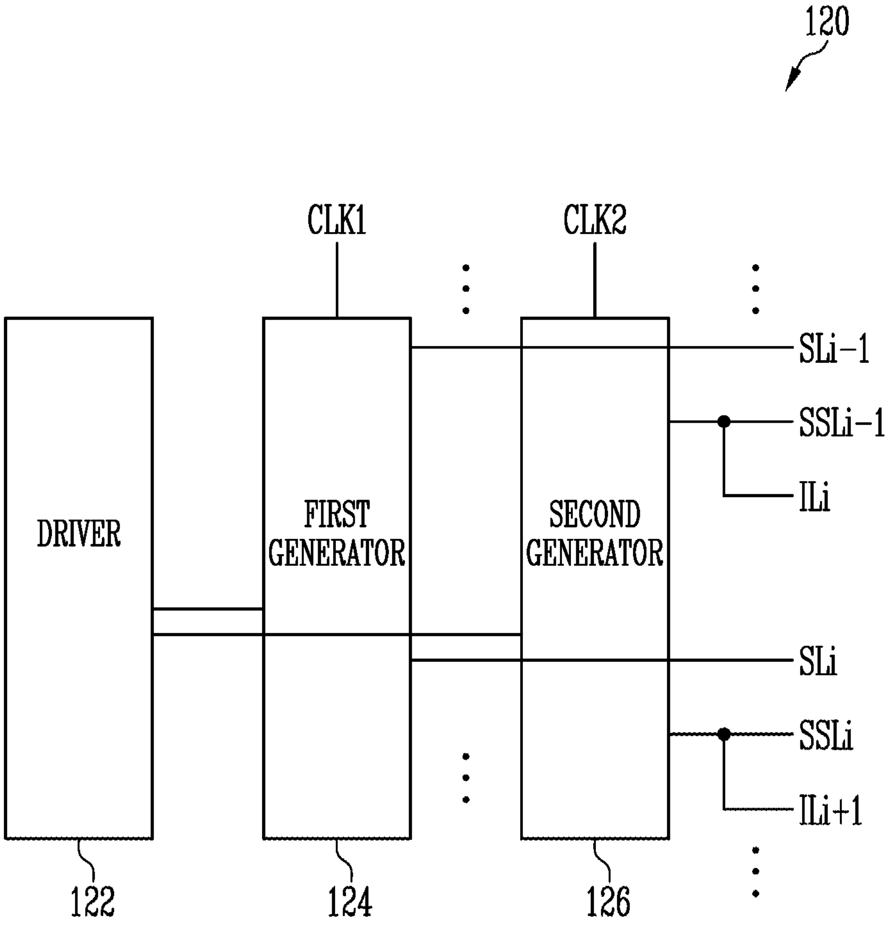
FIG. 8 and FIG. 9 illustrate a scan driver shown in FIG. 1, according to some embodiments of the present disclosure.
Figure 9:
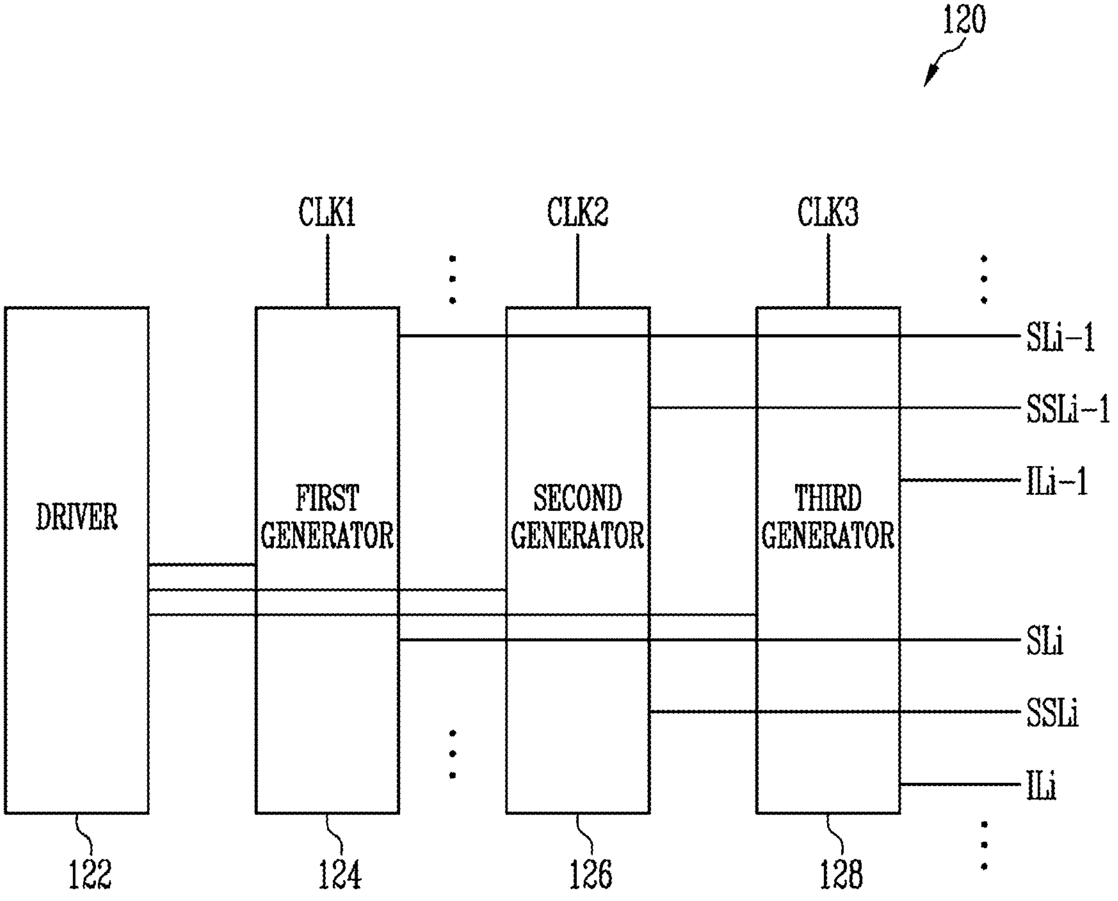

FIG. 8 and FIG. 9 illustrate a scan driver shown in FIG. 1, according to some embodiments of the present disclosure.

Referring to FIG. 8, the scan driver 120 according to some embodiments of the present disclosure may include a driver 122, a first generator 124, and a second generator 126.

The driver 122 may control the first generator 124 and the second generator 126 so that enable scan signals may be generated. For example, the driver 122 includes a plurality of transistors, and may control a first clock signal CLK1 to be sequentially outputted to the first scan lines SLi−1 and SLi as the enable first scan signal SC. For example, the driver 122 includes a plurality of transistors, and may control a second clock signal CLK2 to be sequentially outputted to the second scan lines SSLi−1 and SSLi as the enable second scan signal SS.

The first generator 124 may sequentially supply the first clock signal CLK1 to the first scan lines SLi−1 and SLi in response to the control of the driver 122. Here, the first clock signal CLK1 supplied to the first scan lines SLi−1 and SLi may be supplied to the pixels PX as the enable first scan signal SC.

The second generator 126 may sequentially supply the second clock signal CLK2 to the second scan lines SSLi−1 and SSLi in response to the control of the driver 122. Here, the second clock signal CLK2 supplied to the second scan lines SSLi−1 and SSLi may be supplied to the pixels PX as the enable second scan signal SS.

Additionally, the scan signal SS supplied to the second scan lines SSLi−1 and SSLi may be supplied to the pixels PX as the third scan signal IS. For example, the i-th third scan line ILi may be at least one of the second scan lines disposed in the previous horizontal lines. For example, the i-th third scan line ILi may be electrically connected to the (i−1)-th second scan line SSLi−1. For example, the (i+1)-th third scan line ILi+1 may be electrically connected to the i-th second scan line SSLi.

In some embodiments of the present disclosure, the scan driver 120 may further include a third generator 128, as shown in FIG. 9.

The driver 122 may control the third generator 128 so that the enable third scan signal IS may be generated. For example, the driver 122 includes a plurality of transistors, and may control the third clock signal CLK3 to be sequentially outputted to the third scan lines ILi−1 and ILi as the enable third scan signal IS.

The third generator 128 may sequentially supply the third clock signal CLK3 to the third scan lines ILi−1 and ILi in response to the control of the driver 122. Here, the third clock signal CLK3 supplied to the third scan lines ILi−1 and ILi may be supplied to the pixels PX as the enable third scan signal IS.

Figure 10:
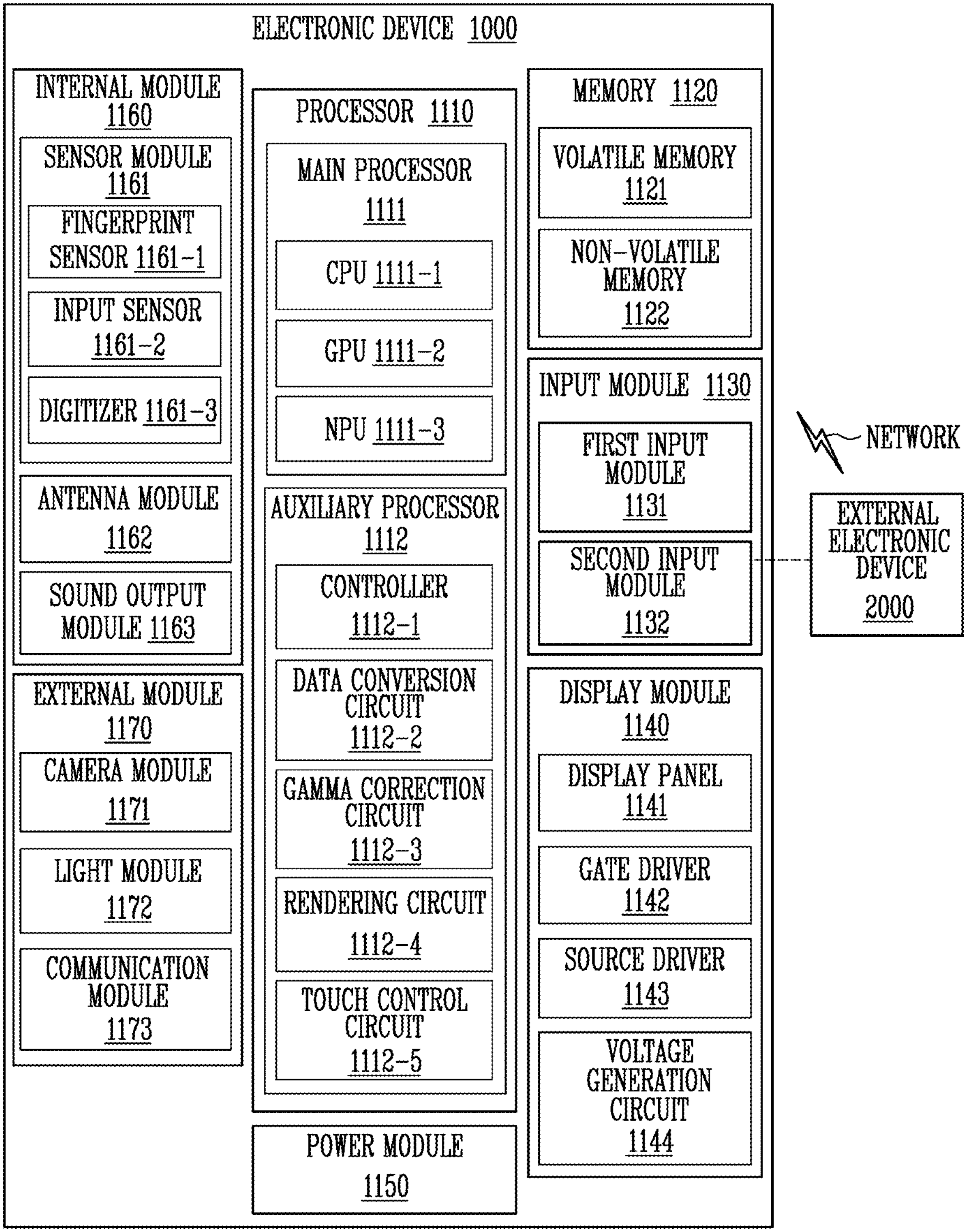
FIG. 10 illustrates an electronic device according to some embodiments of the present disclosure.

FIG. 10 illustrates an electronic device according to some embodiments of the present disclosure.

Referring to FIG. 10, an electronic device 1000 according to some embodiments outputs various information through a display module 1140. When a processor 1110 executes an application stored in a memory 1120, the display module 1140 provides application information to a user through a display panel 1141.

The processor 1110 obtains external input through an input module 1130 or a sensor module 1161 and executes an application corresponding to the external input. For example, when the user selects a camera icon (or a camera application icon) displayed on the display panel 1141, the processor 1110 obtains user input through an input sensor 1161-2 and activates the camera module 1171. The processor 1110 transmits image data corresponding to a captured image obtained through the camera module 1171 to the display module 1140. The display module 1140 may display an image corresponding to the captured image through the display panel 1141.

As another example, when personal information authentication is executed in the display module 1140, a fingerprint sensor 1161-1 obtains inputted fingerprint information as input data. The processor 1110 compares the inputted data obtained through the fingerprint sensor 1161-1 with authentication data stored in the memory 1120, and executes an application according to the compared result. The display module 1140 may display information executed according to application logic through the display panel 1141. The fingerprint sensor 1161-1 may be disposed so that fingerprint information may be obtained from the entire area of the display module 1140 (or the display panel 1141).

As another example, when a music streaming icon displayed on the display module 1140 is selected, the processor 1110 obtains user input through the input sensor 1161-2 and activates a music streaming application stored in the memory 1120. When a music execution instruction is inputted from the music streaming application, the processor 1110 activates a sound output module 1163 to provide sound information corresponding to the music execution instruction to the user.

In the above, the operation of the electronic device 1000 has been briefly described. Hereinafter, a configuration of the electronic device 1000 will be described in further detail. Some of components of the electronic device 1000 to be described later may be integrated and provided as one component, and one component thereof may be divided and provided as two or more components.

The electronic device 1000 may communicate with an external electronic device 2000 through a network (e.g., a short range wireless communication network or a long range wireless communication network). According to some embodiments, the electronic device 1000 may include the processor 1110, the memory 1120, the input module 1130, the display module 1140, a power module 1150, an embedded module 1160, and an external module 1170. According to some embodiments, in the electronic device 1000, at least one of the aforementioned constituent elements may be omitted, or one or more other constituent elements may be added. According to some embodiments, some (e.g., the sensor module 1161, an antenna module 1162, or a sound output module 1163) of the aforementioned constituent elements may be integrated into another constituent element (e.g., the display module 1140).

The processor 1110 may execute software to control at least one other constituent element (e.g., a hardware or software constituent element) of the electronic device 1000 connected to the processor 1110, and may perform various data processing or calculations. According to some embodiments, as at least some of the data processing or operation, the processor 1110 may store an instruction or data received from other constituent element (e.g., the input module 1130, the sensor module 1161, or a communication module 1173) in a volatile memory 1121, may process the instructions or data stored in the volatile memory 1121, and may store the result data in a non-volatile memory 1122.

The processor 1110 may include a main processor 1111 and an auxiliary processor 1112. The main processor 1111 may include a central processing unit (CPU) 1111-1. The main processor 1111 may further include one or more of a graphic processing unit (GPU) 1111-2, a communication processor (CP), and an image signal processor (ISP). The main processor 1111 may further include a neural processing unit (NPU) 1111-3. The neural processing unit 1111-3 is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, and a combination of two or more thereof, but is not limited to the above example. The artificial intelligence models may additionally or alternatively include a software structure in addition to the hardware structure thereof. At least two of the aforementioned processing unit and processor may be implemented as an integrated component (e.g., a single chip), or each thereof may be implemented as an independent component (e.g., a plurality of chips).

The auxiliary processor 1112 may include a controller 1112-1. The controller 1112-1 may include an interface conversion circuit and a timing control circuit. For example, the controller 1112-1 may include the timing controller 140 shown in FIG. 1. The controller 1112-1 receives an image signal from the main processor 1111, and converts a data format of the image signal to meet an interface specification with the display module 1140 to output image data. The controller 1112-1 may output various control signals utilized for driving the display module 1140.

The auxiliary processor 1112 may further include a data conversion circuit 1112-2, a gamma correction circuit 1112-3, a rendering circuit 1112-4, and a touch control circuit

1112-5. The data conversion circuit 1112-2 may receive image data from the controller 1112-1, and it may compensate the image data to display the image with a desired luminance according to characteristics of the electronic device 1000 or a user's setting, or convert the image data to reduce power consumption or compensate for an afterimage effect.

The gamma correction circuit 1112-3 may convert the image data or gamma reference voltage so that the image displayed on the electronic device 1000 has a desired gamma characteristic. The rendering circuit 1112-4 may receive image data from the controller 1112-1 and render the image data in consideration of pixel disposition of the display panel 1141 applied to the electronic device 1000.

The touch control circuit 1112-5 may supply a touch signal to the input sensor 1161-2, and may receive a sensing signal from the input sensor 1161-2 in response to the touch signal.

At least one of the data conversion circuit 1112-2, the gamma correction circuit 1112-3, the rendering circuit 1112-4, and the touch control circuit 1112-5 may be incorporated into another constituent element (e.g., the main processor 1111 or the controller 1112-1). At least one of the data conversion circuit 1112-2, the gamma correction circuit 1112-3, and the rendering circuit 1112-4 may be integrated into a source driver 1143 to be described later.

The memory 1120 may store various data used by at least one constituent element (e.g., the processor 1110 or the sensor module 1161) of the electronic device 1000, and input data or output data for an instruction related thereto. In addition, various setting data corresponding to the user's setting may be stored in the memory 1120. The memory 1120 may include at least one or more of the volatile memory 1121 and the non-volatile memory 1122.

The input module 1130 may receive an instruction or data to be used for a constituent element (e.g., the processor 1110, the sensor module 1161, or the sound output module 1163) of the electronic device 1000 from the outside of the electronic device 1000 (e.g., a user or the external electronic device 2000).

The input module 1130 may include a first input module 1131 to which an instruction or data is inputted from a user and a second input module 1132 to which an instruction or data is inputted from the external electronic device 2000. The first input module 1131 may include a microphone, a mouse, a keyboard, a key (e.g., a button), a pen (e.g., a passive pen or active pen), or the like. The second input module 1132 may support a designated protocol that may be connected to the external electronic device 2000 by wire or wirelessly. According to some embodiments, the second input module 1132 may include a high definition multimedia interface (HDMI), a universal serial bus (USB) interface, an SD card interface, an audio interface, or the like. The second input module 1132 may include a connector that may be physically connected to the external electronic device 2000, for example, an HDMI connector, a USB connector, an SD card connector, an audio connector (e.g., a headphone connector), or the like.

The display module 1140 visually provides information to the user. The display module 1140 may include a display panel 1141, a gate driver 1142, a source driver 1143, and a voltage generation circuit 1144. The display module 1140 may further include a window, a chassis, and a bracket to protect the display panel 1141. The display module 1140 may include at least some components of the display device 100 shown in FIG. 1.

The display panel 1141 (e.g., a display) may include a liquid crystal display panel, an organic light emitting display panel, or an inorganic light emitting display panel, and the type of display panel 1141 is not particularly limited. The display panel 1141 may be a rigid type, or a flexible type that may be rolled or folded. The display module 1140 may further include a supporter, a bracket, or a heat dissipation member for supporting the display panel 1141. The display panel 1141 may include the display portion 110 shown in FIG. 1. That is, the display panel 1141 may include at least one of the pixels PX, PXa, PXb, and PXc shown in FIG. 3, FIG. 5, FIG. 6, and FIG. 7.

The gate driver 1142 may be mounted on the display panel 1141 as a driving chip. In addition, the gate driver 1142 may be integrated in the display panel 1141. For example, the gate driver 1142 includes an amorphous silicon TFT gate driver circuit (ASG), a low temperature polycrystaline silicon (LTPS) TFT gate driver circuit, or an oxide semiconductor TFT gate driver circuit (OSG) that is embedded in the display panel 1141. The gate driver 1142 receives a control signal from the controller 1112-1, and outputs scan signals to the display panel 1141 in response to the control signal. The gate driver 1142 may include the scan driver 120 shown in FIG. 1.

The display module 1140 may further include a light emitting driver. The light emitting driver outputs a light emitting control signal to the display panel 1141 in response to the control signal received from the controller 1112-1. The light emitting driver may be formed separately from the gate driver 1142, or may be integrated in the gate driver 1142.

The source driver 1143 receives a control signal from the controller 1112-1, converts image data into an analog voltage (e.g., a data signal) in response to the control signal, and then outputs data signals to the display panel 1141. The source driver 1143 may include the data driver 130 shown in FIG. 1.

The source driver 1143 may be integrated into other constituent elements (e.g., the controller 1112-1). The functions of the interface conversion circuit and the timing control circuit of the controller 1112-1 described above may be integrated into the source driver 1143.

The voltage generation circuit 1144 may output various voltages utilized for driving the display panel 1141. For example, the voltage generation circuit 1144 may include the power generator 150 shown in FIG. 1.

In some embodiments, the source driver 1143 may convert data corresponding to red (R), green (G), and blue (B) included in the image data received from the processor 1110 into a red data signal (e.g., data voltage), a green data signal, and a blue data signal to provide them to the plurality of pixel arrays included in the display panel 1141 during one horizontal period.

The power module 1150 supplies power to the constituent elements of the electronic device 1000. The power module 1150 may include a battery in which a power voltage is charged. The battery may include a non-rechargeable primary battery, or a rechargeable battery or fuel cell. The power module 1150 may include a power management integrated circuit (PMIC). The PMIC supplies power (e.g., optimized power) to each of the above-described modules and modules to be described later. The power module 1150 may include a wireless power transmission/reception member electrically connected to a battery. The wireless power transmission/reception member may include a plurality of antenna radiators in a form of a coil. In some embodiments, at least some components of the power module 1150 and the voltage generation circuit 1144 may be integrated into one.

For example, the voltage generation circuit 1144 may be included in the power module 1150.

The electronic device 1000 may further include an internal module 1160 and an external module 1170. The internal module 1160 may include the sensor module 1161, the antenna module 1162, and the sound output module 1163. The external module 1170 may include the camera module 1171, a light module 1172, and the communication module 1173.

The sensor module 1161 may sense input by a user's body (e.g., a user's finger) or input by the pen among the first input module 1131, and may generate an electrical signal or a data value corresponding to the input. The sensor module 1161 may include at least one or more of the fingerprint sensor 1161-1 the input sensor 1161-2 and the digitizer 1161-3

The fingerprint sensor 1161-1 may generate a data value corresponding to a user's fingerprint.

The input sensor 1161-2 may generate a data value corresponding to coordinate information of input by the user's body or input by the pen. The input sensor 1161-2 generates an amount of change in capacitance by the input as a data value. The input sensor 1161-2 may sense input by the passive pen, or may transmit/receive data with the active pen.

The input sensor 1161-2 may measure a biosignal such as blood pressure, water, body fat, or the like. For example, when the user touches a part of the body to the sensor layer or the sensing panel and does not move for a certain period of time, based on a change in an electric field by the part of the body, the input sensor 1161-2 may sense a biosignal and output desired information to the display module 1140.

The digitizer 1161-3 may generate a data value corresponding to coordinate information of a pen input. The digitizer 1161-3 generates an electromagnetic change amount by the input as a data value. The digitizer 1161-3 may sense input by the passive pen, or may transmit/receive data with the active pen.

At least one of the fingerprint sensor 1161-1 the input sensor 1161-2 and the digitizer 1161-3 may be implemented as a sensor layer disposed on the display panel 1141 through a continuous process. At least one of the fingerprint sensor 1161-1, the input sensor 1161-2, and the digitizer 1161-3 may be disposed at an upper side of the display panel 1141, and one of the fingerprint sensor 1161-1, the input sensor 1161-2, and the digitizer 1161-3, for example, the digitizer 1161-3 may be disposed at a lower side of the display panel 1141.

At least two or more of the fingerprint sensor 1161-1, the input sensor 1161-2, and the digitizer 1161-3 may be formed to be integrated into one sensing panel through the same process. When integrated into one sensing panel, the sensing panel may be disposed between the display panel 1141 and a window disposed at an upper side of the display panel 1141. According to some embodiments, the sensing panel may be disposed on the window, and the position of the sensing panel is not particularly limited.

At least one of the fingerprint sensor 1161-1 the input sensor 1161-2 and the digitizer 1161-3 may be embedded in the display panel 1141. That is, at least one of the fingerprint sensor 1161-1 the input sensor 1161-2 and the digitizer 1161-3 may be concurrently (e.g., simultaneously) formed through the process of forming elements (e.g., a light emitting element, a transistor, and the like) included in the display panel 1141.

In addition, the sensor module 1161 may generate an electrical signal or a data value corresponding to an internal state or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and/or the like.

The antenna module 1162 may include one or more antennas for transmitting or receiving a signal or power to or from the outside. According to some embodiments, the communication module 1173 may transmit a signal to an external electronic device or receive a signal from an external electronic device through an antenna suitable for a communication method. An antenna pattern of the antenna module 1162 may be integrated into one component (e.g., the display panel 1141) of the display module 1140 or the input sensor 1161-2.

The sound output module 1163 is a device for outputting a sound signal to the outside of the electronic device 1000, and may include, for example, a speaker used for general purposes such as multimedia playback or recording playback, and a receiver used exclusively for receiving calls. According to some embodiments, the receiver may be provided integrally with or separately from the speaker. A sound output pattern of the sound output module 1163 may be integrated into the display module 1140.

The camera module 1171 may capture still images and moving images. According to some embodiments, the camera module 1171 may include one or more lenses, image sensors, or image signal processors. The camera module 1171 may further include an infrared camera capable of measuring the presence or absence of the user, the position of the user, and the gaze of the user.

The light module 1172 may provide light. The light module 1172 may include a light emitting diode, a xenon lamp, or the like. The light module 1172 may operate in conjunction with the camera module 1171 or may operate independently.

The communication module 1173 may support establishment of a wired or wireless communication channel between the electronic device 1000 and the external electronic device 2000, and communication through the established communication channel. The communication module 1173 may include one or both of a wireless communication module, such as a cellular communication module, a short range communication module, or a global navigation satellite system (GNSS) communication module and a wired communication module such as a local area network (LAN) communication module or a power line communication module. The communication module 1173 may communicate with the external electronic device 2000 through a short range communication network such as Bluetooth, WiFi direct, or infrared data association (IrDA) or a long range communication network such as a cellular network, the Internet, or a computer network (e.g., LAN or WAN). The various types of the communication modules 1173 described above may be implemented as a single chip or may be implemented as separate chips.

The input module 1130, the sensor module 1161, the camera module 1171, and the like may be used to control an operation of the display module 1140 in conjunction with the processor 1110.

The processor 1110 outputs an instruction or data to the display module 1140, the sound output module 1163, the camera module 1171, or the light module 1172 based on input data received from the input module 1130. For example, the processor 1110 may generate image data in response to input data applied through a mouse or an active pen to output it to the display module 1140, or may generate instruction data in response to the input data to output it to the camera module 1171 or light module 1172. When input data is not received from the input module 1130, the processor 1110 may reduce power consumed by the electronic device 1000 by changing an operation mode of the electronic device 1000 to a low power mode or a sleep mode.

The processor 1110 outputs an instruction or data to the display module 1140, the sound output module 1163, the camera module 1171, or the light module 1172 based on sensing data received from the sensor module 1161. For example, the processor 1110 may compare authentication data applied by the fingerprint sensor 1161-1 with authentication data stored in the memory 1120 and then execute an application according to the compared result. The processor 1110 may execute an instruction based on sensed data sensed by the input sensor 1161-2 or the digitizer 1161-3, or may output corresponding image data to the display module 1140. When the sensor module 1161 includes a temperature sensor, the processor 1110 may receive temperature data for a measured temperature from the sensor module 1161, and may further perform luminance correction on image data based on the temperature data.

The processor 1110 may receive measurement data about the presence of a user, a user's position, a user's gaze, and the like, from the camera module 1171. The processor 1110 may further perform luminance correction and the like on image data based on the measurement data. For example, the processor 1110 that determines the presence of a user through an input from the camera module 1171 may output image data whose luminance is corrected through the data conversion circuit 1112-2 or the gamma correction circuit 1112-3 to the display module 1140.

Some of the above constituent elements may be connected to each other through a communication method between peripheral devices, for example, a bus, a general purpose input/output (GPIO), a serial peripheral interface (SPI), a mobile industry processor interface (MIPI), or an ultra path interconnect (UPI) link to exchange a signal (e.g., an instruction or data) with each other. The processor 1110 may communicate with the display module 1140 through a mutually agreed interface, for example, may use one of the above-described communication methods, and is not limited to the above-described communication methods.

While this disclosure has been described in connection with what is presently considered to be practical embodiments, it is to be understood that the disclosure is not limited to the disclosed embodiments, but, on the contrary, is intended to cover various suitable modifications and equivalent arrangements included within the spirit and scope of the present disclosure as defined by the appended claims and equivalents thereof.

What is claimed is:

1. A pixel comprising:

a first transistor having a first electrode connected to a first power line, a gate electrode connected to a first node, and a second electrode connected to a second node;

a light emitting element connected between the second node and a second power line;

a second transistor connected between a data line and the first node and having a gate electrode connected to a first scan line;

a third transistor connected between the second node and a lead-out line and having a gate electrode connected to a second scan line; and a fourth transistor having a first electrode connected to the first node or the second node, a second electrode connected to the lead-out line to which a first initialization power source is supplied or a third power line to which a second initialization power source is supplied, and a gate electrode connected to a third scan line, wherein each of the first initialization power source and the second initialization power source is set to a voltage that turns off the first transistor when supplied to the first node and turns off the light emitting element when supplied to the second node.

2. The pixel of claim 1, wherein the second initialization power source has a voltage equal to or less than a voltage of the first initialization power source.

3. The pixel of claim 2, wherein the first electrode of the fourth transistor is connected to the first node, and the second electrode of the fourth transistor is connected to the lead-out line.

4. The pixel of claim 2, wherein the first electrode of the fourth transistor is connected to the first node, and the second electrode of the fourth transistor is connected to the third power line.

5. The pixel of claim 2, wherein the first electrode of the fourth transistor is connected to the second node, and the second electrode of the fourth transistor is connected to the lead-out line.

6. The pixel of claim 2, wherein the first electrode of the fourth transistor is connected to the second node, and the second electrode of the fourth transistor is connected to the third power line.

7. The pixel of claim 1, wherein the fourth transistor is turned on during a first period of a frame period, and the second transistor and the third transistor are turned on during a second section after the first period.

8. The pixel of claim 1, wherein the third scan line is one of a plurality of second scan lines on a previous horizontal line.

9. The pixel of claim 1, further comprising:

a storage capacitor connected between the first node and the second node.

10. A display device comprising:

pixels connected to scan lines, data lines, and lead-out lines;

a scan driver driving the scan lines; and a data driver driving the data lines, wherein at least one of the pixels comprises:

a first transistor having a first electrode connected to a first power line, a gate electrode connected to a first node, and a second electrode connected to a second node;

a light emitting element connected between the second node and a second power line;

a second transistor connected between one of the data lines and the first node and configured to turn on in response to a first scan signal being received from the scan driver;

a third transistor connected between a lead-out line of the lead-out lines and the second node and configured to turn on in response to a second scan signal being received from the scan driver;

a fourth transistor having a first electrode connected to the first node or the second node, and a second electrode connected to the lead-out line to which a first initialization power source is supplied or a third power line to which a second initialization power source is supplied, and configured to turn on in response to a third scan signal being received from the scan driver; and a storage capacitor connected between the first node and the second node, wherein each of the first initialization power source and the second initialization power source is set to a voltage that turns off the first transistor when supplied to the first node and turns off the light emitting element when supplied to the second node.

11. The display device of claim 10, wherein the second initialization power source has a voltage equal to or less than a voltage of the first initialization power source.

12. The display device of claim 11, wherein the first electrode of the fourth transistor is connected to the first node, and the second electrode of the fourth transistor is connected to the lead-out line.

13. The display device of claim 11, wherein the first electrode of the fourth transistor is connected to the first node, and the second electrode of the fourth transistor is connected to the third power line.

14. The display device of claim 11, wherein the first electrode of the fourth transistor is connected to the second node, and the second electrode of the fourth transistor is connected to the lead-out line.

15. The display device of claim 11, wherein the first electrode of the fourth transistor is connected to the second node, and the second electrode of the fourth transistor is connected to the third power line.

16. The display device of claim 10, wherein the scan driver is configured to supply a third scan signal during a first period of a frame period, and to supply the first scan signal and the second scan signal during a second period after the first period.

17. The display device of claim 10, wherein the third scan signal supplied to an i-th horizontal line (where i is a natural number) is the second scan signal supplied to an (i−1)-th horizontal line.

18. An electronic device comprising:

a display panel comprising pixels;

a processor configured to drive the display panel; and a voltage generation circuit configured to supply a voltage of a driving power source to the display panel, wherein at least one of the pixels comprises:

a first transistor having a first electrode connected to a first power line, a gate electrode connected to a first node, and a second electrode connected to a second node;

a light emitting element connected between the second node and a second power line;

a second transistor connected between a data line and the first node and having a gate electrode connected to a first scan line;

a third transistor connected between the second node and a lead-out line and having a gate electrode connected to a second scan line;

a fourth transistor having a first electrode connected to the first node or the second node, a second electrode connected to the lead-out line to which a first initialization power source is supplied or a third power line to which a second initialization power source is supplied, and a gate electrode connected to a third scan line; and a storage capacitor connected between the first node and the second node, wherein each of the first initialization power source and the second initialization power source is set to a voltage that turns off the first transistor when supplied to the first node and turns off the light emitting element when supplied to the second node.

19. The electronic device of claim 18, wherein the second initialization power source has a voltage equal to or less than a voltage of the first initialization power source.

* * * * *